United States Patent [19]
Zanoni

[11] 3,907,439
[45] Sept. 23, 1975

[54] EDGE-SENSING WITH A SCANNING LASER BEAM

[75] Inventor: Carl A. Zanoni, Middletown, Conn.

[73] Assignee: Zygo Corporation, Middlefield, Conn.

[22] Filed: Apr. 24, 1974

[21] Appl. No.: 463,654

Related U.S. Application Data

[63] Continuation-in-part of Ser. No. 388,267, Aug. 14, 1973, Pat. No. 3,856,411, which is a continuation-in-part of Ser. No. 368,441, June 8, 1973, abandoned.

[52] U.S. Cl. .................. 356/160; 250/560; 356/167
[51] Int. Cl.² .................. G01B 11/04; G01B 11/10
[58] Field of Search ........... 356/156, 159, 160, 167, 356/199; 250/206, 559–561, 563

[56] References Cited
UNITED STATES PATENTS

| | | | |
|---|---|---|---|
| 2,659,823 | 11/1953 | Vossberg, Jr. | 356/160 |
| 3,467,473 | 9/1969 | Preston | 356/121 |
| 3,765,774 | 10/1973 | Petrohilos | 250/560 X |

*Primary Examiner*—Siegfried H. Grimm
*Attorney, Agent, or Firm*—Milton Zucker

[57] ABSTRACT

An electrooptical sensor is described which provides an output for precisely locating the edge of an object. By passing a collimated laser beam across the edge of an opaque object, either by moving the laser beam, by moving the object, or both, and photoelectrically sensing the light passing by the object, the coincidence of the edge of the object and the center of the laser beam can be precisely determined from the first and second derivatives of the output of a photodetector.

2 Claims, 3 Drawing Figures

EDGE-SENSING WITH A SCANNING LASER BEAM

RELATED APPLICATION

This application is a continuation-in-part of my application Ser. No. 388,267 filed Aug. 14, 1973, now U.S. Pat. No. 3,856,411, which application is in turn a continuation-in-part of my application Ser. No. 368,441 filed June 8, 1973 and now abandoned. The invention claimed herein is also largely disclosed, but not generically claimed, in my applications Ser. No. 394,562 filed Sept 6, 1973, now U.S. Pat. No. 3,856,412, and Ser. No. 421,247 filed Dec. 3, 1973, now U.S. Pat. No. 3,853,406.

BACKGROUND OF THE INVENTION

1. Field of the Invention

The present invention relates to apparatus for the accurate determination of the coincidence of the center of a laser beam and the edge of an opaque object. Specifically, the apparatus determines the coincidence of the center of a laser beam and the edge of an opaque object when the laser beam and the edge of the object are scanned past each other. More particularly, the invention relates to noncontacting electrooptical apparatus for this type of determination which is capable of rapidly and accurately measuring the dimensions of objects or holes in objects, measuring the location of edges of objects, measuring the position or location of objects if two edges are sensed, and measuring the thickness of sheets.

2. The Prior Art

For the accurate measurement of the diameter, position, or thickness of soft, delicate, hot, or moving objects, non-contacting sensors must be used. Prior-art devices of this character include capacitive gauges, eddy-current gauges, air gauges, gamma and X-ray gauges, and optical sensors. Only the optical and nuclear gauges can work at distances greater than a small fraction of an inch with sufficient sensitivity. The nuclear gauges permit large working distances; however, they are extremely expensive and susceptible to systematic errors due to slight variations in the chemical composition of the object being measured.

Optical sensors have advantages because of the nature of light itself. The principal advantages are:

1. They do not require direct mechanical contact between the sensor and the object to be measured;
2. The distance from the sensor to the object to be measured can be large;
3. The response time is limited to that of the photodetector and its electronics;
4. Light variations are directly convertible to electrical signals; and
5. The measurements are independent of the chemical composition of the object.

Prior-art optical sensors employ various techniques to determine the coincidence of the center of a scanned laser beam and an edge of an object. For example, Petrohilos U.S. Pat. No. 3,765,774 issued Oct. 16, 1973, discloses an optical measuring apparatus wherein a laser beam scanned in a parallel fashion is used to measure the diameter of objects. In the subject disclosure, the edge sensing is carried out using a threshold level on the output of the photosensor. To accommodate variations in light levels of the laser, automatic gain control (AGC) is incorporated. Nevertheless, this technique is sufficiently insensitive to require that the diameter of the laser beam at the edge of the object be quite small, e.g., 0.005 inch. Thus, the angular divergence of the laser beam is quite large, since the bare laser beam must be brought to focus near the edge of the object. Therefore, the measurement region over which the technique is useful is quite limited because the size of the scanned laser beam is not uniform and increases on either side of focus.

In the case of an optical thickness gauge, it is necessary to ascertain the coincidence of the center of the laser beam and a reference edge, i.e., the edge of interest is not necessarily an edge of the object being measured. An example can be found in Flower U.S. Pat. No. 3,536,405, which discloses an optical thickness gauge. In this disclosure, the center of the laser beam is ascertained relative to a slit. While this technique may be sufficient for some applications, many applications require an edge-sensing technique of considerably greater sensitivity.

While these prior-art techniques for ascertaining the coincidence of the center of a laser beam and an edge are useful for many measurements, they cannot be used for accurate control of many industrial operations. For example, in the high-speed extrusion of aluminium rod, it is desirable to get readings with accuracies of 0.0001 inch. The extruded rod moves in every direction as it comes out of the die so that the sensor must be capable of fast, accurate measurements over a large measurement volume, i.e., several inches on a side. The measurement of sheet thickness in a rolling mill is an example where a high-sensitivity sheet thickness gauge with a large working distance is required.

It has been proposed in Vossberg Jr. U.S. Pat. No. 2,659,823 to use the infrared heat from a hot object, or X-ray shadows, to measure the size of hot objects or of objects opaque or semiopaque to X-rays. The energy from the object is focused onto a rotating mirror, which reflects the energy through a slit into a photodetector, to produce a signal which is then differentiated three times to finally produce a square signal whose duration is proportional to the size of the object being measured. The measurements are quite sensitive to dust in the slit. Most importantly, his method is limited to an object fixed in a plane, since with either of his configurations, the scale factor will vary if the distance between his object and his lens varies.

OBJECTS OF THE INVENTION

This invention aims to improve the accuracy with which the coincidence of the center of a laser beam and the edge of an opaque object can be determined. This technique has broad utility in optical devices used to measure object diameters, sheet thickness, and object positions in a noncontacting manner.

Other objects of the invention will be apparent from the following description taken in connection with the accompanying drawings.

STATEMENT OF THE INVENTION

In accordance with the instant invention, I provide (1) a source of radiant energy, most preferably light from a laser, to produce a narrow beam of collimated light with, desirably, a Gaussian intensity profile; (2) means for collecting and photosensing the portion of the light beam passing by an edge; and (3) means for processing the photosensor output to produce a signature indicating the coincidence of the center of the laser beam with the edge. The accurate determination of the precise point at which the center of the laser beam passes the edge is obtained by defining the edge as the point at which the first derivative of the output of the photosensor amplifier is above a fixed value, and the second derivative of the output of the photosensor amplifier passes through zero.

THE DRAWINGS

DETAILED DESCRIPTION OF THE INVENTION

While the technique has application for a wide range of radiation sources, the following description is taken by way of example with respect to an optical measuring system. The term "radiant energy" as used herein includes, but is not limited to, electromagnetic energy of all frequency ranges.

Figure 1:
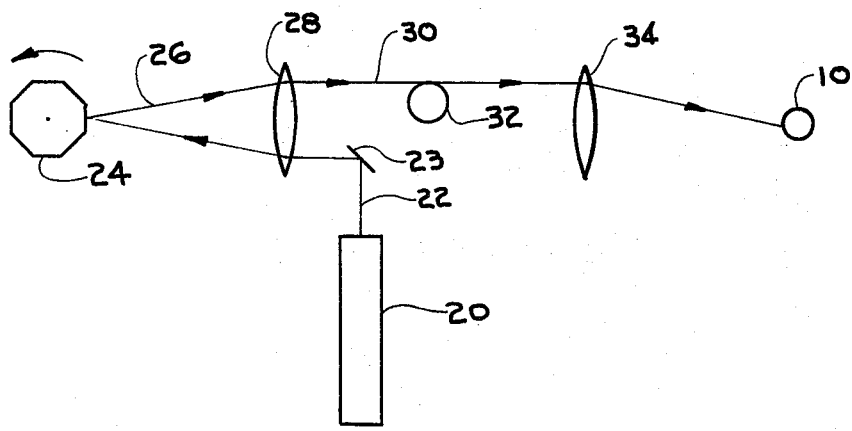
FIG. 1 is a schematic diagram of a very simple optical measuring system.

Referring to FIG. 1 of the drawings, a laser 20 produces a narrow beam of light 22 which falls on a mirror 23, which passes the beam through a lens 28, which in turn focuses the beam onto a uniformly rotating mirror 24, which may be multifaceted as shown, to produce a rotary-scanned beam 26. A lens 28 converts the rotary-scanned beam 26 into a linear-scanned beam 30, which passes by a test object 32, and then to a lens 34 which focuses the beam onto a photoelectric sensor 10. The diameter of the test object 32 is directly proportional to the length of time that the test object cuts off beam 30. Since beam 30 has a finite diameter of about 1 mm—that of the laser beam 22—it is necessary to pinpoint the exact time at which a constant part of the beam passes the edges of the test object 32.

The light source 20 may be a tungsten bulb, xenon bulb, light-emitting diode or other source of energy, but is most preferably a gas laser. The photoelectric sensor 10 may be a vacuum photodiode, photomultiplier, silicon photocell, or a PIN photodiode.

Figure 2:
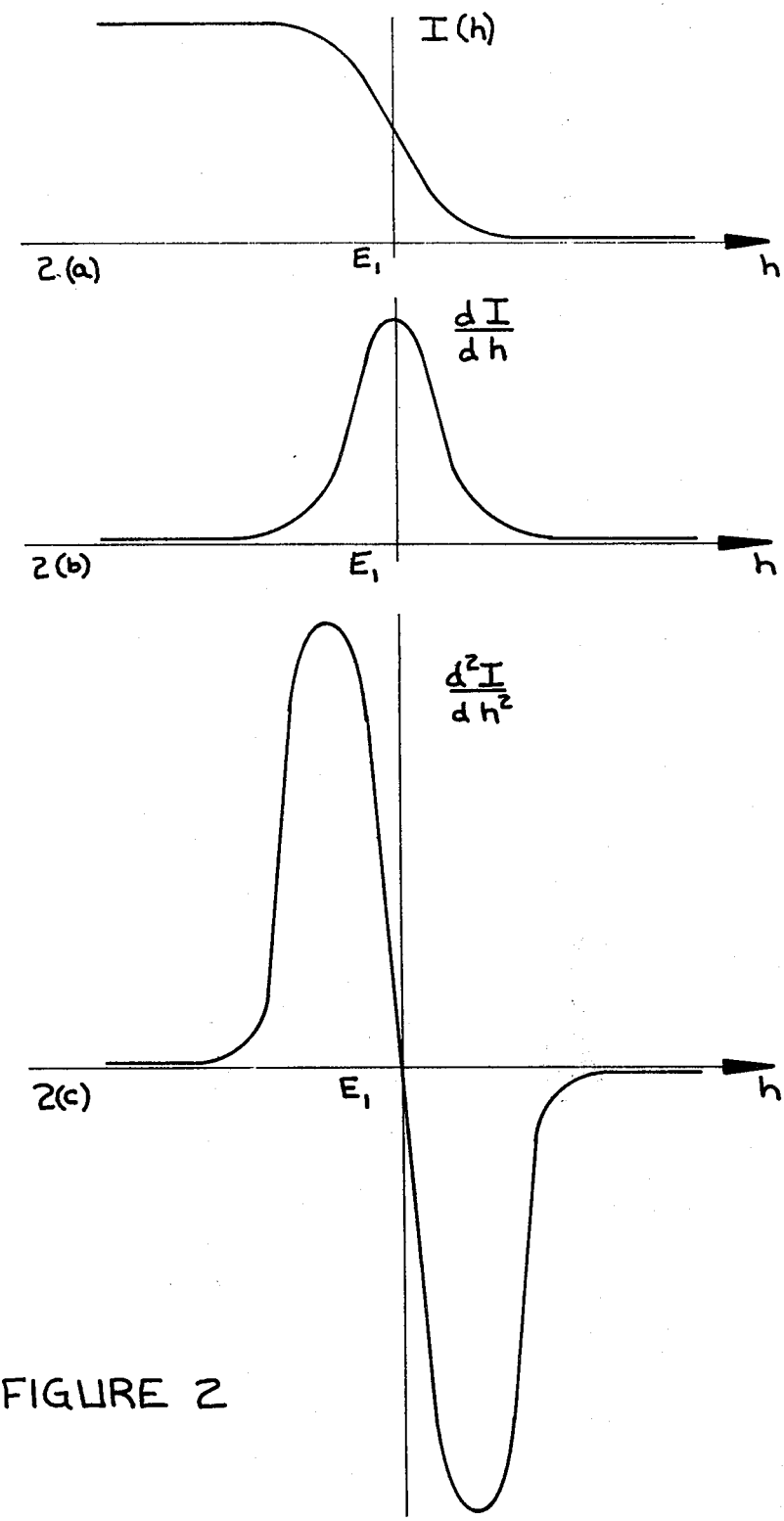
FIG. 2 is a set of curves showing: 2(a) the output of a photodetector preamplifier as a laser beam passes over an opaque edge; (b) the first derivative of 2(a); and (c) the second derivative of 2(a).
Figure 3:
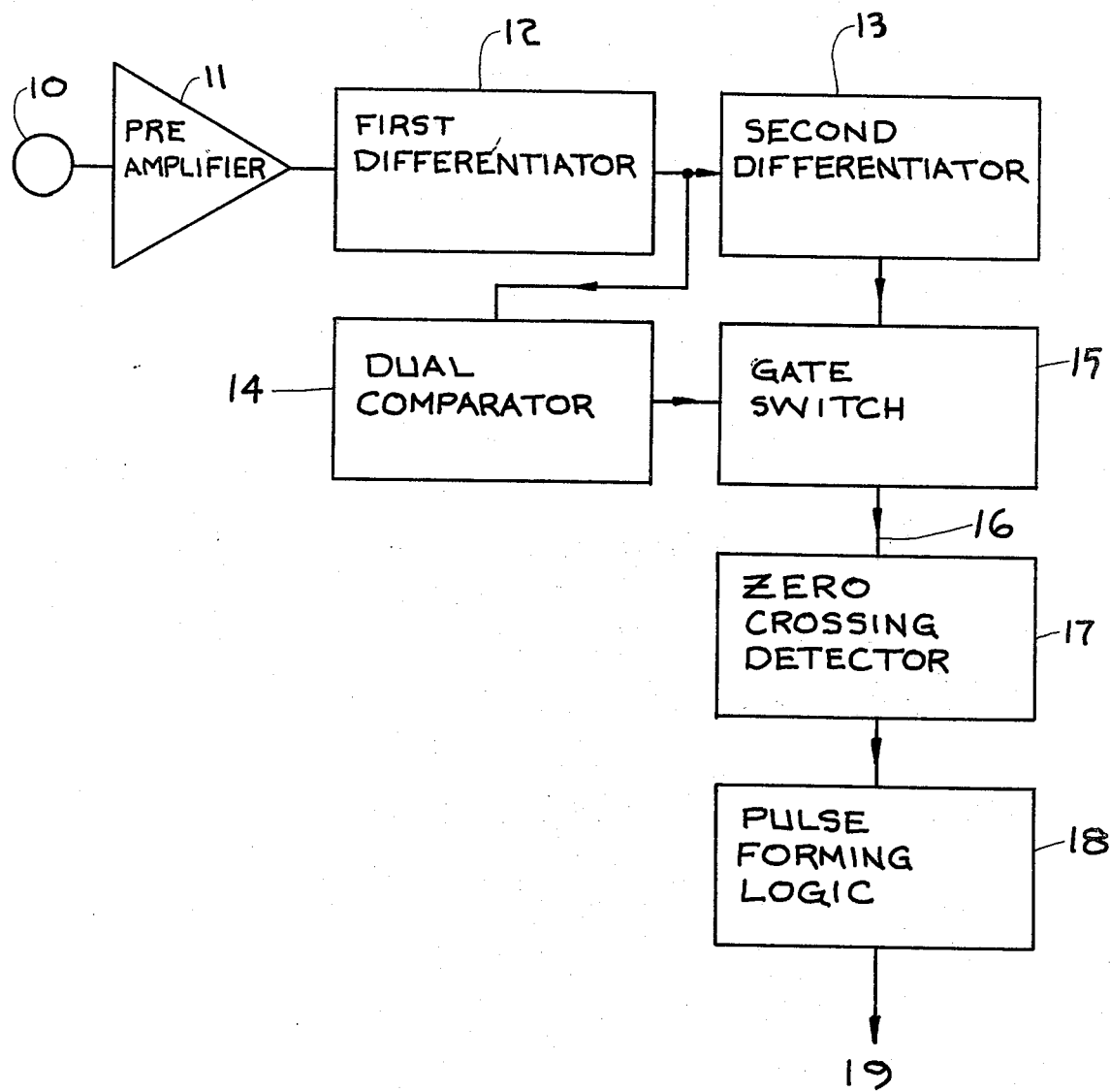
FIG. 3 is a schematic block diagram of the circuitry to define the point at which the center of a scanned laser beam coincides with an edge of the object.

Referring to FIGS. 2 and 3, the output of the photodetector 10 is fed to a preamplifier 11, and yields a curve I($h$) given in FIG. 2($a$). h is the coordinate corresponding to the distance between the center of the laser beam and the edge. I($h$) passes from maximum intensity to zero intensity over a distance which corresponds to the beam diameter; the edges of the object are exactly at the inflection point E1 of curve 2($a$). As the photodetector measures light intensity, it is necessary to determine the point E1 on the curve 2($a$) with maximum certainty, if good resolution is to be obtained.

I determine the point E1 most precisely by means of the techniques illustrated in FIGS. 2 and 3. If the output of the photodetector, curve 2($a$), is differentiated, we get curve 2($b$). This differentiation can be done with conventional electronic circuitry. The output signal in curve 2($b$) is at a maximum at the point E1 on curve 2($a$), since the rate of change is greatest at this point. A further differentiation, to produce the second derivative of the output of the photodetector, gives the curve shown in FIG. 2($c$). Here the curve passes through zero at the point corresponding to E1.

By using the outputs of the first and second electronic differentiators, I am able to pinpoint precisely the edge of the test object as shown in FIG. 3.

The output signal from photodetector 10, curve 2($a$), is amplified in preamplifier 11 and passes into a first differentiator 12 to produce a first derivative signal 2($b$). This first derivative signal is then supplied to two other circuits: (1) to a second differentiator 13 to produce a second derivative signal 2($c$), and (2) to a dual comparator 14 which provides an output signal whenever the absolute value of the first derivative is above a certain value.

The switch 15 is designed so that the second derivative signal 2($c$) from second differentiator 13 passes through only when the dual comparator 14 provides an output signal indicating that the absolute value of the first derivative signal 2($b$) is above a certain value and in the area of its maximum. A threshold for the 2($b$) signal is set in the dual comparator 14, whereby the gate switch 15 passes the signal 2($c$) only during the restricted time at which the absolute value of the signal 2($b$) is above this threshold. The resultant signal 16 passes into a zero-crossing detector 17. The output of the zero-crossing detector passes into pulse-forming circuitry 18 to produce a pulse 19, whose leading or trailing edge signifies the coincidence of the center of the laser beam and the opaque edge.

FIG. 2 shows only the sensor for the leading edge of the object. Obviously, in measuring the object 32 in FIG. 1, the beam is scanned past both edges of the object; as it emerges from behind the object, curves similar to those illustrated are obtained, except that curve 2($a$) rises from 0 to maximum, and curves 2($b$) and 2($c$) are reversed. The size of the test object is determined by the distance between the two edges. For convenience in measuring, the curve 2($b$) for the trailing edge of the object 32 can be flipped so that it is of the same size as the curve shown for the leading edge.

The edge sensor of this invention is useful in conjunction with any optical measuring device which utilizes a beam of energy which is wider than the allowable error of the measurement, since it reduces the edge measurement to an exact position in the beam. The arrangement shown in FIG. 1 is essentially that of the Petrohilos U.S. Pat. No. 3,765,774 issued Oct. 16, 1973; in the device shown in that patent, the use of the instant edge detection device results in both greater accuracy and a considerable economy. The use of the device is shown in my copending applications Ser. No. 388,267 filed Aug. 14, 1973, now U.S. Pat. No. 3,856,411, Ser. No. 394,562 filed Sept. 6, 1973, now U.S. Pat. No. 3,856,412, and Ser. No. 421,247 filed Dec. 3, 1973, now U.S. Pat. No. 3,853,406, where the device is claimed in combination with the specific measuring system of the particular application. The invention is also obviously applicable to any other devices.

While a preferred embodiment of the invention has been disclosed, obviously modifications can be made therein, without departing from the scope of the invention as defined in the following claims.

I claim:

1. An electrooptical edge-sensing device comprising (A) a source of radiant energy which produces a narrow beam; (B) means for scanning said beam and passing at least a portion thereof past an edge of an object;

(C) means for collecting and photosensing said portion of said beam passing said edge to produce a first set of signals; (D) means to differentiate said first signals to produce a second signal with maximum intensity at points corresponding to said edge of said object; (E) means to further differentiate said second signal to produce a third signal of zero intensity at points corresponding to said edge of said object; (F) means to feed a portion of said second signal to a switch to which said third signal is also fed, which switch passes said third signal only for a limited period adjacent the peak of said second signal; and (G) means to utilize the signal from said switch in measuring the position of said edge.

2. The device of claim 1, in which the energy source is a gas laser.

\* \* \* \* \*